United States Patent [19]
Nutting et al.

[11] 4,183,632
[45] Jan. 15, 1980

[54] ELECTRONIC SYSTEM FOR SYNCHRONIZING MOTION PICTURE AND SOUND RECORDINGS

[75] Inventors: Donald W. Nutting; Steven F. Nugent, both of Boulder, Colo.

[73] Assignee: Comput-A-Sound Corporation, Boulder, Colo.

[21] Appl. No.: 699,006

[22] Filed: Jun. 21, 1976

[51] Int. Cl.² ............................................. G03B 31/00
[52] U.S. Cl. .......................................... 352/17; 352/5
[58] Field of Search ................................ 352/12, 17, 5

[56] References Cited
U.S. PATENT DOCUMENTS

| | | | |
|---|---|---|---|
| 2,679,187 | 5/1954 | Bitting | 352/17 |
| 3,049,965 | 8/1962 | Gunst | 352/5 |
| 3,492,068 | 1/1970 | Baron | 352/17 |
| 3,588,558 | 6/1971 | Levin | 352/17 |
| 3,743,392 | 7/1973 | Numata | 352/17 |
| 3,813,153 | 5/1974 | Roth | 352/12 |
| 3,940,208 | 2/1976 | Roth | 352/12 |

*Primary Examiner*—Monroe H. Hayes
*Attorney, Agent, or Firm*—Robert E. Harris

[57] ABSTRACT

An electronic system is disclosed that is particularly useful for synchronizing motion picture and sound recordings. The system includes a sensor that is positioned contiguous to a movie camera during filming and contiguous to a movie projector during film playback to sense a characteristic indicative of film movement and, responsive thereto, producing an electrical output signal. During filming, a sensor, such as a microphone or induction coil, may be positioned contiguous to the movie camera such as by placing the sensor in a cylinder screwed into a camera tripod socket. During playback, the sensor, such as a light sensor, may be positioned to sense light bursts of a running movie projector. A control unit receives the electrical output signal from the sensor and utilizes the same in controlling operation of an associated tape recorder. During filming, the control unit controls operation of the associated tape recorder and causes a timing signal to be recorded on the tape for synchronizing purposes with sound associated with the motion picture also being recorded on the tape recorder. In the control unit, the electrical output signals produced by the sensor during filming is processed utilizing envelope detection as well as filtering in a band pass filter to produce the desired timing signal for synchronization purposes. During playback, the electrical output signal from the sensor and the timing signal from the tape recorder are processed and coupled to counters the output from which controls operation of the tape recorder to automatically achieve and maintain synchronization of picture and sound during playback.

35 Claims, 9 Drawing Figures

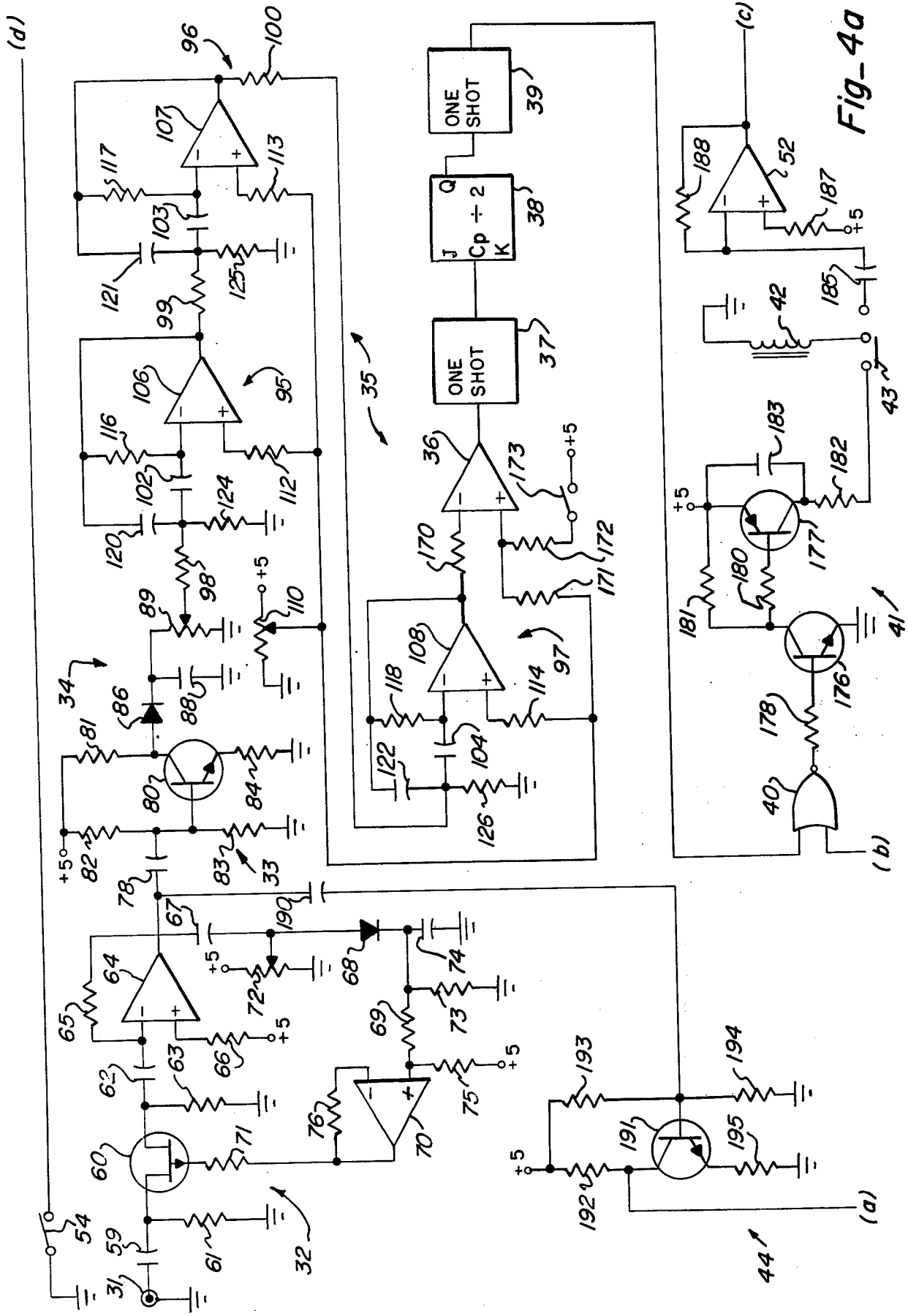
Fig_4a

ELECTRONIC SYSTEM FOR SYNCHRONIZING MOTION PICTURE AND SOUND RECORDINGS

FIELD OF THE INVENTION

This invention relates to an electronic synchronizing system and, more particularly, to an electronic system for synchronizing motion picture and sound recordings.

BACKGROUND OF THE INVENTION

It is oftentimes necessary, or at least desirable, to synchronize operation of two or more devices. One area in which considerable development has heretofore taken place has been in synchronizing sound with motion pictures. For the commercial, or professional, motion picture industry, systems have been developed for achieving such synchronization, but such systems have not proved to be economically feasible and/or practical for amateur use with smaller size film.

For amateur use, various systems have been suggested and/or utilized for synchronizing sound and picture. Included in such suggested systems have been systems for synchronizing movie cameras and/or projectors with tape recorders. Among such systems has been a unit offering a common drive for a projector and tape recorder, systems with various switch actuations in one unit controlling operation of the second unit, systems for recording of signals on tape for timing purposes, and systems for sensing a lack of synchronization between picture and sound. Also such systems have utilized sensors such as vibration and induction coil pick-ups, and utilized the produced signals for synchronization purposes. Examples of such systems may be found, for example, in U.S. Pat. Nos. 2,679,187 and 3,743,392.

While such systems have proved to be satisfactory, at least for some purposes, none of these systems have proved to be completely suitable beyond improvement in providing a synchronizing system for synchronizing motion picture and sound recordings that is practical for use by amateurs. Improvement in such a system has therefore been needed.

SUMMARY OF THE INVENTION

This invention provides a synchronizing system that is well suited for use in synchronizing motion picture and sound recordings. This system is economical, yet dependable for use by amateurs in providing synchronized sound motion pictures. This system includes sensors for sensing characteristics of movement in a movie camera and projector as well as counters for controlling operation of an associated tape recorder. The control unit includes an envelope detector and band pass filter for providing a timing signal during filming as well as counters for achieving and maintaining synchronization between a projector and a tape recorder during playback.

It is therefore an object of this invention to provide an improved synchronizing system.

It is another object of this invention to provide an improved system for synchronizing motion picture and sound recordings.

It is still another object of this invention to provide an improved system for synchronizing motion picture and sound recordings that is economical yet dependable.

It is yet another object of this invention to provide an improved system for synchronizing motion picture and sound recording, that allows a user to record using his own silent camera, with playback achieving a sound movie that includes lip synchronization using his own silent projector.

It is still another object of this invention to provide an improved system for synchronizing motion picture and sound recordings that includes an improved sensor for sensing film movement.

It is another object of this invention to provide an improved system for synchronizing motion picture and sound recordings that include control means having circuitry to ensure prompt start-up of a tape recorder.

It is still another object of this invention to provide an improved system for synchronizing motion picture and sound recordings that include control means having circuitry to ensure signal presence indicative of film movement.

It is yet another object of this invention to provide an improved system for synchronizing motion picture and sound recordings that includes a control unit for controlling operation of a tape recorder, said control unit including an envelope detector and band pass filter for producing a timing signal during filming and counters for achieving and maintaining synchronization between a projector and a tape recorder during playback.

With these and other objects in view as will become apparent to one skilled in the art as the description proceeds, this invention resides in the novel construction, combination, and arrangement of parts substantially as hereinafter described, and more particularly defined by the appended claims, it being understood that such changes in the precise embodiment of the hereindisclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIGS. 4a and 4b are a combined schematic and block diagram of the control circuitry as shown in FIG. 3;

DESCRIPTION OF THE INVENTION

Figure 1:
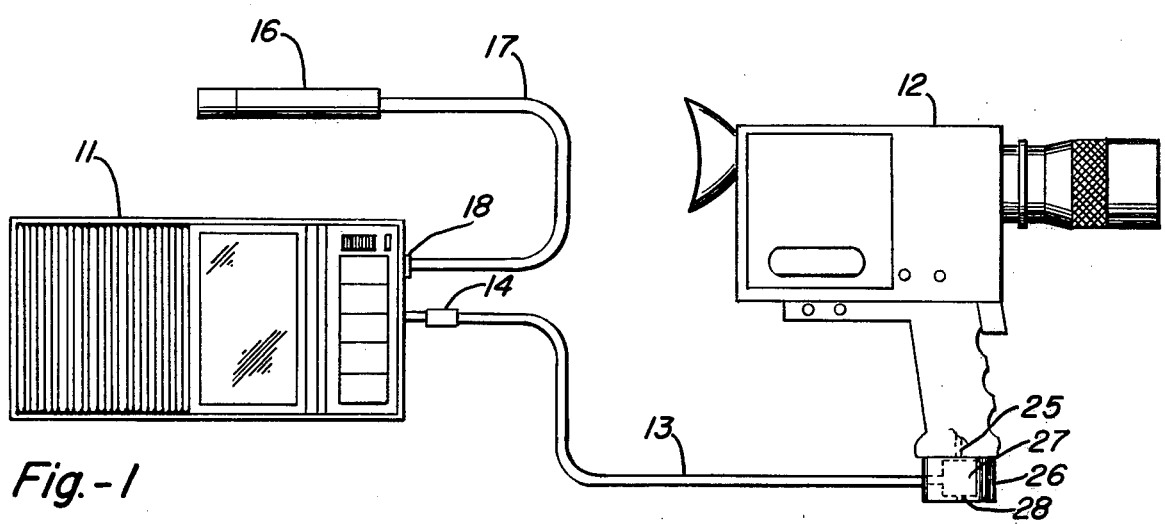
FIG. 1 is a composite view of the system of this invention shown connected with a movie camera for filming of a sound motion picture.

Referring now to the drawings, the numeral 11 in FIG. 1 refers to a recorder, preferably a tape recorder, in which the control circuitry of this invention for the record mode may be housed with the recorder being shown connected with a movie camera 12 through an electrical conduit 13 and plug 14 for filming of a sound picture with synchronized sound. As shown, a microphone 16 may also be connected with recorder 11 through electronic conduit 17 and plug 18 to enable sound to be recorded on the tape recorder.

Figure 2:
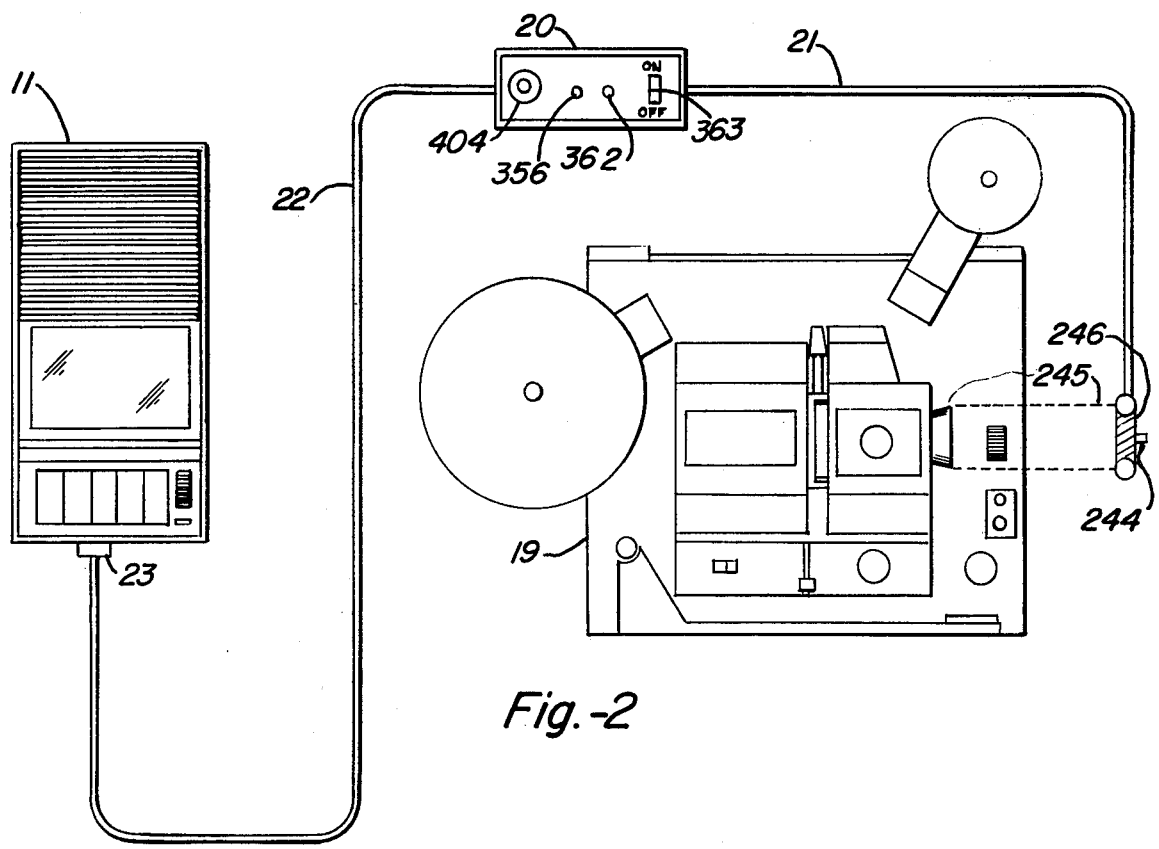
FIG. 2 is a composite view of the system for this invention shown connected with a movie projector for playback with synchronized picture and sound.

In FIG. 2, a movie projector 19 is shown connectable through a playback control unit 20 and electrical conduits 21 and 22 with recorder 11 utilizing plug 23 at the recorder. It is to be understood that the movie camera need be connected with the control unit for operation only during filming and the projector need be connected to the control unit for operation only during playback.

Movie camera 12 may be conventional and may be a conventional movie camera known as a silent camera. At least some such cameras conventionally have a threaded tripod, or socket, 25 into which sensor assembly 26 of this invention may be received when the assembly is of suitable size and is appropriately threaded. For such usage, sensor assembly 26 is preferably a cylinder having a sensor 27 therein to sense a characteristic of the camera, such as vibration that occurs within the camera due to film movement during filming. Sensor 27 may be, for example, a microphone, but an induction coil could be utilized to sense movement inductively. As also shown in FIG. 1, sensor assembly 26 may also have a threaded socket 28 matching socket 25 in the camera therein so that the camera can still be utilized with a tripod if desired As is well known, when an audio sensor, such as a microphone, is placed near an electric or mechanical motor, the sound produced during operation can be picked up by the microphone if the microphone is sufficiently sensitive and placed near the sound producing element. In like manner, an inductive coil can provide an inductive pick-up if near an appropriate moving element such as a toothed gear (not shown), for example. The sensor assembly 26 of this invention does not require modification of conventional movie cameras and need not invade the interior of the camera in order to sense film movement.

As indicated in FIG. 1, when the sensor assembly 26 is a threaded cylinder having the sensor 27 (such as a microphone or piezoelectric generator) therein, the cylinder is firmly attached to the movie camera, as by being secured into the tripod socket of the camera (or into any other conventional socket found in the camera).

When the camera is activated, the vibrations created by the camera during filming travel through the camera into the sensor cylinder, and are picked up by the vibration sensor. The sound thus picked up includes the sound of the pulses created by a series of beats emanated from the moving elements of the camera, such as the pull-down claw. The pulse of the pull-down claw corresponds to the frame rate that the camera is pulling the film through the camera gate and is therefore the frame rate pulse. This pulse record when picked up by the sensor provides an electrical output signal usable for timing purposes and is coupled from the sensor through electrical conduit 13 to the control circuitry in recorder 11.

Tape recorder 11 may be conventional except for the addition of the control circuitry for the record mode so that the control circuitry controls operation (as by energization of the tape recorder motor causing tape movement) and recording of the timing signal on the moving tape. The tape may, if desired, have dual tracks for recording of sound and timing signals separately.

Figure 3:
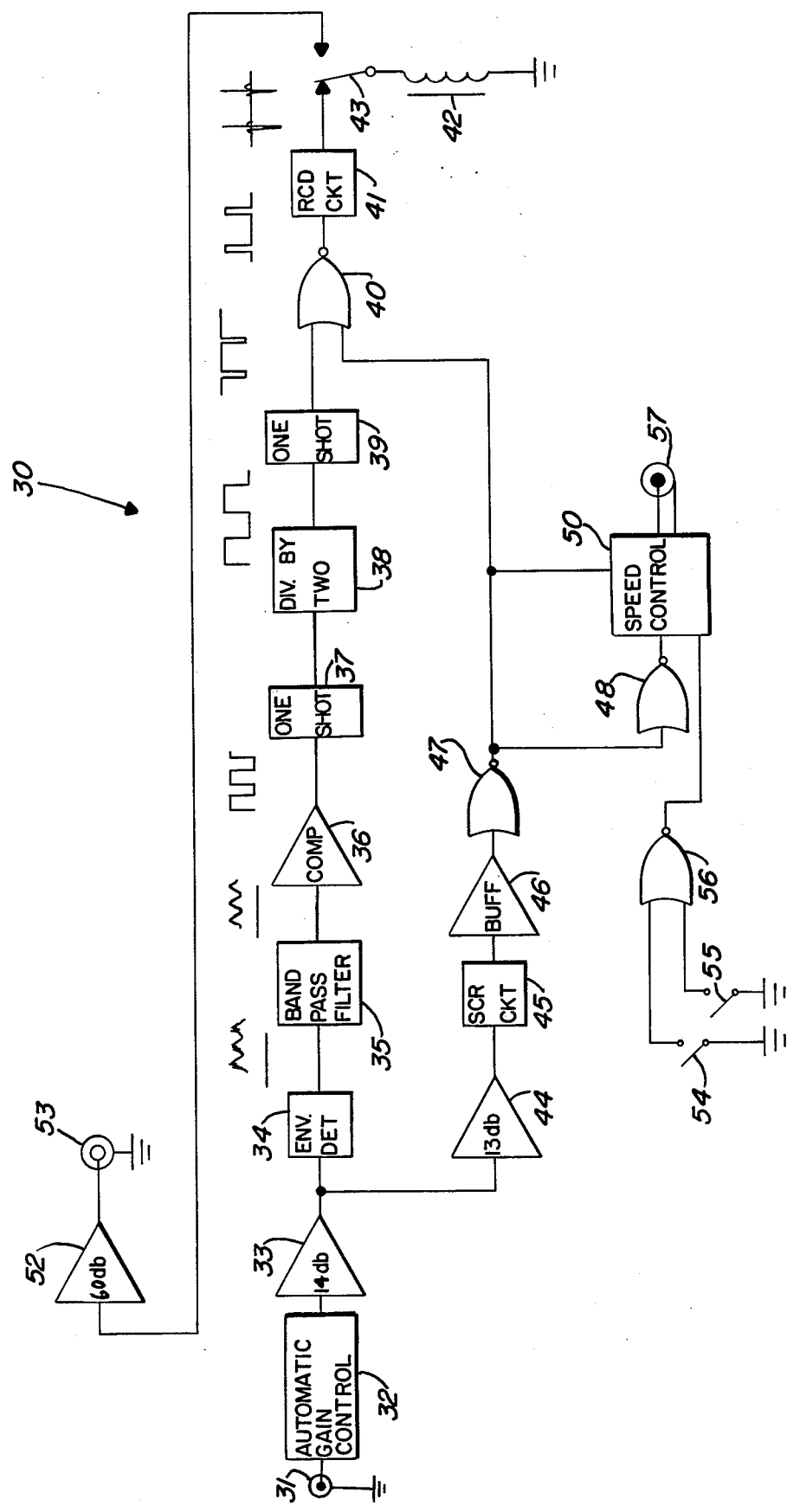
FIG. 3 is a block diagram of the control circuitry of this invention that may be included in the recording unit with the control circuitry being primarily utilized during filming.

The control circuitry, within the recorder for the record mode, is shown in block form in FIG. 3. The electrical output signal from sensor 27 coupled through electrical conduit 13 is coupled into the control circuitry, or unit, 30 at jack 31. The input, or noise, signal is preferably coupled through an automatic gain control circuit 32 to compensate for differing signal amplitudes at the input as a result of using different cameras. The noise signal is then amplified with a 14 db gain amplifier 33 and thereafter detected by an amplitude modulation detector (envelope detector) 34.

The resulting signal that has been envelope demodulated is coupled through a sixth order band pass filter 35 (consisting of three active cascaded filters, each filter being of second order so that the active filters are all tuned to pass signals centered at about 36 Hz and having a band pass of about 33 Hz to 39 Hz. The signal from the filter 35 is then coupled to a comparator 36 which compares at the same level that is quiescent for the three filters making up band pass filter 35.

The output from comparator 36 is a square wave of the same frequency as the output of the filter. The square wave is then shaped by one-shot multivibrator 37, and the resulting signal is coupled into a T flipflop 38 operating to divide the frequency of the input signal by two, so that the signal that emerges is a square wave of voltage at a frequency of about 18 Hz. (when this is the frame rate being utilized).

The output from circuit 38 is coupled to one-shot multivibrator 39, the output from which is a pulse of short duration that is coupled to inhibit gate 40 (a NOR gate). The output from inhibit gate 40 is coupled to recording circuit 41 allowing the current to flow through and drive the tape head 42 when mode control switch 43 is positioned in record position as shown in FIG. 3.

The noise signal from amplifier 33 is also coupled into a 13 db gain amplifier 44 which produces a solid envelope of noise which clips at zero and plus five volts. The output from amplifier 44 is coupled capacitively to the gate of silicon controlled rectifier (SCR) 45, and when the noise signal is present, the SCR is turned on. The signal from SCR 45 is coupled through a buffer amplifier 46 to NOR gate 47 so that when the signal is present at the input of the filter, the output goes high. When this occurs, NOR gate 47 switches and goes low.

As the signal from NOR gate 47 goes low, inhibit gate 40 (connected to NOR gate 47) is activated, thus letting the output from one-shot multivibrator 39 pass to the record circuit 41. The effect of this is that inhibit gate 40 is open only when there is a noise signal, which immediately opens it. Thus, when there is no noise signal, inhibit gate 40 is immediately closed, preventing extraneous pulses from being introduced into the recording head, which could occur if inhibit gate 40 was not included in the circuit.

The signals from NOR gate 47 are also coupled to NOR gate 48 which inverts the signals. The signal from NOR gate 48 is coupled to the motor control circuit 50.

Also connected to the tape head is a 14 gain preamplifier 52 that is used for playback purposes. When in the playback mode (with switch 43 opposite to that shown in FIG. 3), the tape head is coupled to the preamplifier to give enough gain to the signal being picked up by the tape head to allow transmission of the signal through jack 53. Switches 54 and 55 are connected with NOR gate 56 which is connected with speed control circuit 50 to enable motor control bypass. This enables normal record/play mode operation. An input to the speed control circuit 50 may also be coupled through jack 57.

Both the record and playback circuits are based on logic. Rather than recording a sinusoidal wave, impulses are recorded which have been derived from a filtered signal that itself is derived from an envelope detection circuit. Thus, the system of this invention takes the noise signal and puts it through an amplifier into an amplitude modulation, or envelope, detector. The band pass filter then filters the envelope. Instead of the actual noise being filtered, the envelope of the noise is detected and the top of the envelope is thus used as a signal to be filtered. The envelope detector in effect takes a high frequency noise and converts it into a low frequency signal. In the system of this invention, by the use of envelope detection, the signal in the noise does not have to be as large in comparison to the noise. Thus, the sensor can be placed at a greater distance from the origin of the beating signal from the pull-down claw and thus, the sensor can be at almost any point on the camera, thereby increasing the number of points of attachment of the vibration sensor to the camera including outside the camera. The main criteria for workability is that there be a firm contact of the vibration sensor to the camera to allow the vibration to easily pass from the camera to the sensor such as is achieved in this invention by a sensor assembly that screws firmly into the tripod socket of a camera.

Figure 4B:
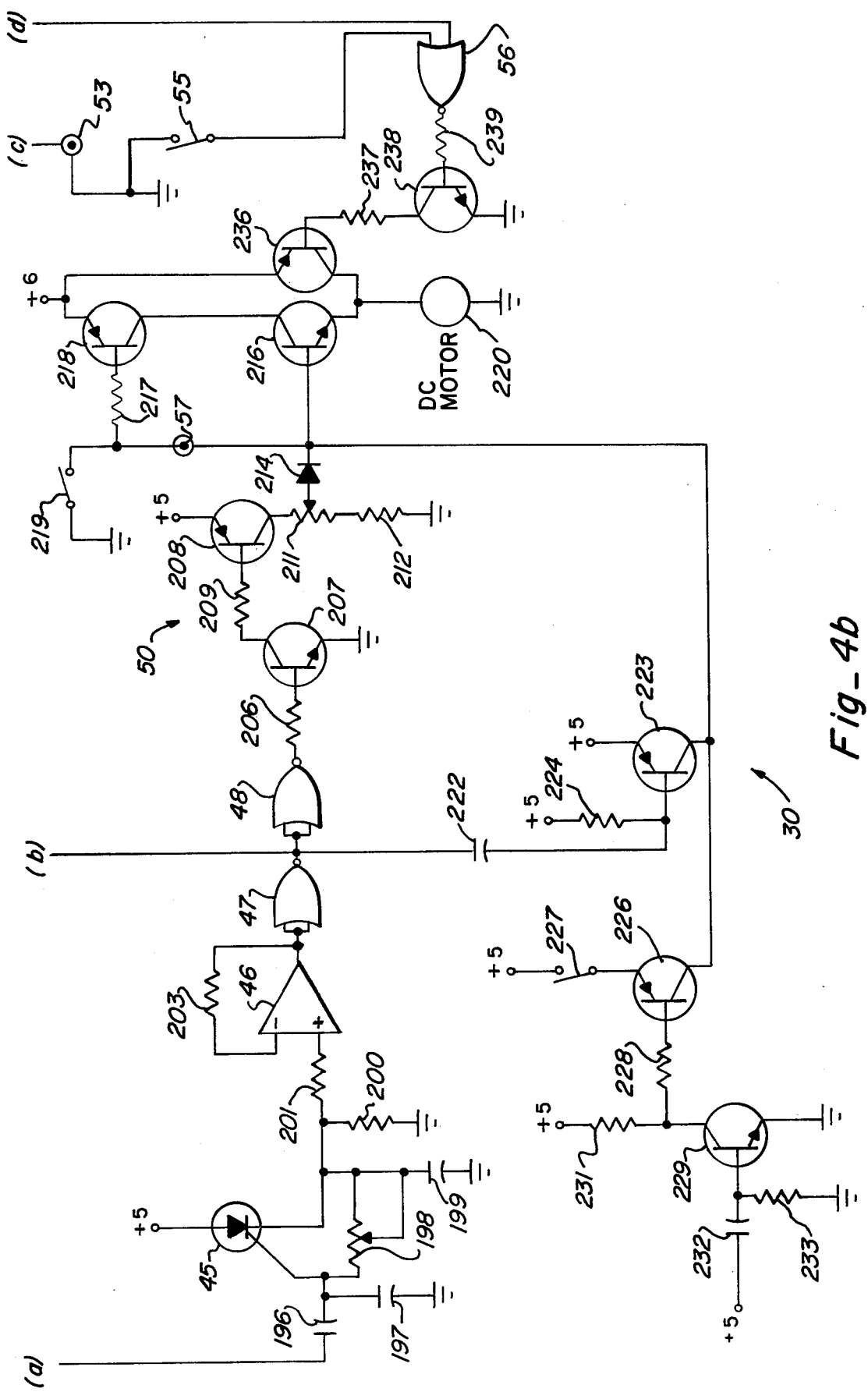

The combined schematic and block diagram of FIG. 4 shows the control circuitry 30 of FIG. 3 in greater detail. As shown in FIG. 4, the input signal is coupled through jack 31 to the automatic gain control (AGC) circuit 32, and more particularly coupled through capacitor 59 to field effect transistor (FET) 60, with the junction between capacitor 59 and FET 60 having a resistor 61 to ground. The output for FET 60 is coupled through a filter (formed by capacitor 62 and resistor 63) and coupled to the − input of summing amplifier 64, which input is also connected with the output of the amplifier through resistor 65. The + input of amplifier 64 is connected with the +5 volt power supply through resistor 66.

The output from amplifier 64 is also coupled back to FET 60 through capacitor 67, diode 68, resistor 69, amplifier 70, and resistor 71 connected to the gate of FET 60. The junction of capacitor 67 and diode 68 is connected with the center tap of potentiometer 72 (connected between the +5 volt power supply and ground), the junction of diode 68 and resistor 69 has a resistor 73 and a capacitor 74 to ground, resistor 69 is connected to the + input of amplifier 70 with the junction therebetween being connected to the +5 volt power supply through resistor 75, and the − input of amplifier 70 is connected with the output of the amplifier through resistor 76. Thus, a compensatory feedback network is established to ensure that the gain of amplifier 64 is inversely proportioned to the level of the signal input to jack 31.

The output from amplifier 64 is coupled through capacitor 78 to the base of transistor 80 of 14 Dz gain amplifier 33. The collector of transistor 80 is connected with the +5 volt power supply through resistor 81, while the base of transistor 80 is connected to the +5 volt power supply through resistor 82 and with ground through resistor 83. The emittor of transistor 80 is connected with ground through resistor 84.

The output from the collector of transistor 80 is coupled to the detector circuitry 34, and, more particularly, to diode 86. The cathode of diode 86 is connected to one side of capacitor 88 and potentiometer 89, the other side of each of which is connected with ground. The center tap of potentiometer 89 is connected with the band pass filter 35, which filter consists of three active cascaded filter 95, 96 and 97, as shown in FIG. 4. Each filter section 95, 96 and 97 may be identical and includes a resistor (designated as resistors 98, 99 and 100) and a series connected capacitor (designated as capacitors 102, 103 and 104) connected with the − (or non-inverting) input lead to a 20 db gain amplifier (designated as amplifiers 106, 107 and 108). In addition, the + (or inverting) input lead is connected with the variable tap of a potentiometer 110 (connected between the +5 volt power source and ground) through a resistor (designated as resistors 112, 113 and 114), while the output side of the amplifier is connected to opposite sides of the capacitor through a resistor (designated as resistors 116, 117 and 118) at one side and through a capacitor (designated as capacitors 120, 121 and 122) at the other side, which side also has a resistor to ground (designated as resistors 124, 125 and 126).

As also shown in FIG. 4, the output from filter 35 is coupled to the − input of comparator 36 through resistor 170. The + input to the comparator is connected with the center tap of potentiometer 110 through resistor 171 and to the +5 volt power supply through resistor 172 and switch 173.

As also shown in block form in FIG. 4, the output from comparator 36 is coupled to conventional one-shot multivibrator 37 to shape the signal and then to conventional divide-by-two circuit 38 to divide the frequency of the signal by two. From the divide-by-two circuit 38, the signal is coupled through conventional one-shot multivibrator 39 to one input of inhibit circuit 40.

As also shown in FIG. 4, the recording circuit 41 includes a pair of transistors 176 and 177, the former of which receives an output from inhibit circuit 40 through resistor 178 and the latter of which is connected to the collector of transistor 176 through resistor 180. In addition, the collector of transistor 176 is connected to the −5 volt power supply through resistor 181 and the collector of transistor 177 is connected through resistor 182 and switch 43 to tape head 42. When NPN transistor 176 is turned on, this produces a voltage at the base of PNP transistor 177 to turn transistor 177 on completely to allow current to flow through and drive tape head 42.

Transistor 177 also has a capacitor 183 connected between the collector and emitter so that when the transistor is switched with a square wave, the current that is caused to pass through the tape head is an impulse. In addition, the presence of capacitor 183 across the tape head, causes a positive and then a negative impulse to be produced which charges and discharges the tape head so that the tape head remains neutral and thus is consistently demagnetized.

As brought out hereinabove, switch 43 establishes the operational mode, i.e., record or playback. For playback, the output from tape head 42 is coupled through switch 43 and capacitor 185 to the − input of 60 db gain amplifier 52 the output of which is coupled from the circuit through jack 53. As shown in FIG. 4, the + input of amplifier 52 is connected to the +5 volt power supply through resistor 187 and the output of amplifier 52 is connected with the − input through resistor 188.

The output from amplifier 64 is also coupled through capacitor 190 to the base of transistor 191 of 13 db gain amplifier 44. The collector and base of transistor 191 are connected with the +5 volt power supply through resistors 192 and 193, respectively, while the base and emitter are connected with ground through resistors 194 and 195, respectively.

The output from amplifier 44 is coupled through capacitor 196 to the gate of silicon controlled rectifier (SCR) 45. The gate of SCR 45 also has capacitor 197 to ground connected therewith and is connected to one end of potentiometer 198 the other end and center tap of which are connected to SCR 45 and have a bypass capacitor 199 to ground connected therewith. SCR 45 also has a resistor 200 to ground connected therewith and the output of SCR 45 is coupled through resistor 201 to the + input of buffer amplifier 46.

The output of buffer amplifier 46 has resistor 203 connected to the + input, and the output from buffer amplifier 46 is coupled to NOR gate 47, the output of which is coupled as a second input to inhibit gate 40 and NOR gate 48.

The signal from NOR gate 48 is coupled through resistor 206 to the base of transistor 207. The collector of transistor 207 is connected to the base of transistor 208 through resistor 209. When NPN transistor 207 is turned on, the base of PNP transistor 207 is turned on, the base of PNP transistor 208 is pulled low to turn on transistor 208. The collector of transistor 208 is connected with ground through potentiometer 211 and resistor 212 with the center tap of potentiometer 211 being connected through diode 214 to the base of drive transistor 216. Diode 214 isolates transistor 208 from other circuits which are also connected to the base of driving transistor 216.

The collector of transistor 216 is connected to the collector of transistor 218, the emitter of transistor 218 is connected to a +6 volt power supply, the base of transistor 218 is connected through resistor 217 to jack 57 and through switch 219 with ground, and the emitter of transistor 216 is connected to DC motor 220. Driving transistor 216 is an emitter follower and the voltage at the base (less 0.7 volts) appears at the emitter and thus across motor 220 of the recorder to thus provide a constant current-variable voltage speed control for the motor.

NOR gate 47 is also connected through capacitor 222 to the base of transistor 223, the base of which is also connected through resistor 224 to the +5 volt power supply. When the signal from NOR gate 47 goes low, it is coupled to transistor 223, the collector of which is connected to the base of driving transistor 216. When triggered on, transistor 223 is momentarily on for a time proportional to the RC time constant determined by capacitor 222 and resistor 224.

For the short time transistor 223 is on full, this allows the +5 volts to appear at the base of transistor 216 and this allows +6 volts through transistor 216 to drive the motor 220 at maximum speed. The total effect of the circuit is that the motor 220 is given a short kick when the recorder is turned on by sensing camera vibrations to thus allow substantially immediate start-up of the recorder. This avoids necessary pulses not being recorded at the beginning of a scene being shot on film.

The base of transistor 216 is also connected with the collector of transistor 226, the emitter of which is connected through switch 227 to the +5 volt power supply and the base of which is connected through resistor 228 to the collector of transistor 229. The collector of transistor 229 is connected to the +5 volt power supply through resistor 231 and the base of transistor 229 is connected to the +5 volt power supply through capacitor 232 and to ground through resistor 233.

Complementary transistors 226 and 229 act as an advance circuit. When record switch 227 is closed for recording, this turns on transistor 229 for a time duration equal to the time constant of capacitor 232 and resistor 233. When transistor 229 turns on, transistor 226 is turned on thus turning on driving transistor 216 completely and causing motor 220 to be operated at maximum speed for a time determined by the time constant capacitor 232 and resistor 233.

A function of the automatic advance circuit is to provide a tape leader for playback purposes since there may be no physical leader on the tape that is being utilized. The lack of a physical tape leader is desirable since necessary pulses could be omitted on recording at the beginning of the first scene. However, when rewinding a cassette for playback, upon reaching the beginning of the tape and stopping, the tape could rebound, thus losing the first pulse, or several pulses, at the beginning of the first scene. Therefore, a predetermined length of leader is measured out when the recorder is initially engaged in record. This will, in effect, advance the pulses of the first scene on the tape, and thus place them out of reach of the problem of the rewind-rebounding on playback.

Motor control bypass to enable normal record-play mode operation is also provided utilizing transistor 236, the collector of which is connected to motor 220, the emitter of which is connected to the +6 volt power supply and the base of which is connected through resistor 237 to the collector of transistor 238. The base of transistor 238 is connected through resistor 239 to the output of NOR gate 56.

With both switches 54 and 55 closed, output from inhibit gate 56 goes high, causing transistor 238 to turn on to pull down the base of transistor 236. This essentially shorts transistor 236 across all record-playback motor control circuitry. With either jacks 31 or 53 in use, transistor 236 is off and the motor control is enabled.

Transistor 218 is on continuously in record mode since record switch 219 is closed and jack 57 is not in use. In playback mode, control voltage is applied to the bases of driving transistor 216 and transistor 218 through jack 57.

For playback, a conventional movie projector 19, as shown in FIG. 2, is utilized instead of a movie camera, and the projector is connected with the tape recorder through control unit 20, as indicated in FIG. 2. The frame rate pulse of the projector is preferably derived from the projector lamp. Eight millimeter projectors commonly have three bladed shutters (not shown) through which light is produced in three bursts of light for each frame of film. In order to generate a projector pulse, light sensor 244, preferably an infra-red type of sensor, may be attached to the lens barrel 245 of the projector 19 by a metal clip 246 so that the light sensor picks up a signal from each light burst of the running projector, which signal is fed through electrical conduit 21 to the playback control unit 20. Control unit 20 is connected with tape recorder 11 through electrical conduit 22, as indicated in FIG. 2, and also controls operation of the tape recorder in the playback mode.

Figure 5:
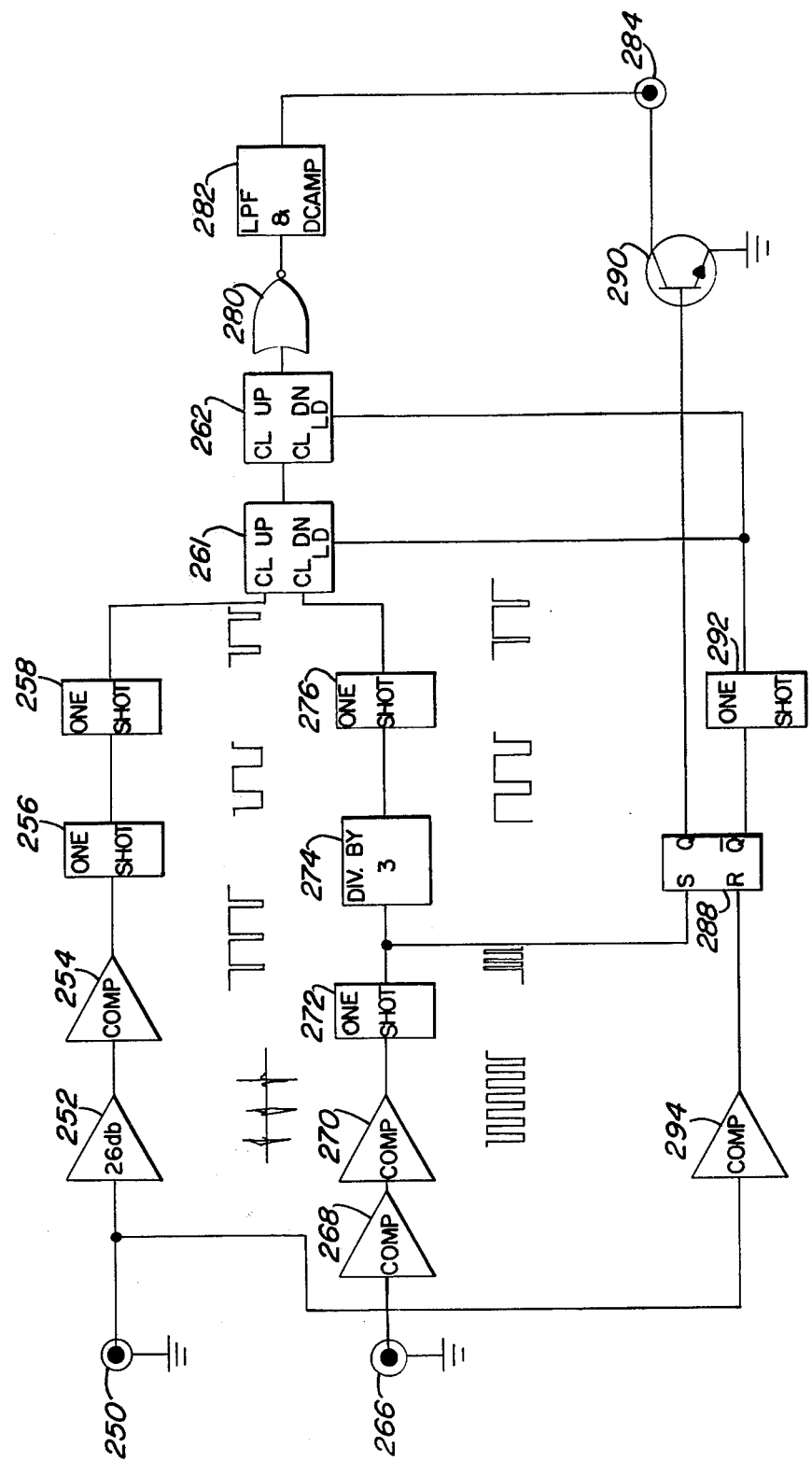
FIG. 5 is a block diagram of the control circuitry of this invention which is preferably included in an individual control unit with the control circuitry being primarily utilized during playback.

In the playback mode, the timing signal from the tape recorder is coupled into the control unit 20 through jack 250, and, as shown in FIG. 5, through 26 db gain amplifier 252, which shifts the quiescent level to zero volts. The amplifier offsets the signal down so that only half the signal is being used. This signal is then coupled to a comparator 254 which compares very close to the zero voltage level. The comparator output is normally high and pulses low when the signal is present to sample the signal. This sample signal fires a one-shot multivibrator 256 which acts as a time delay of sufficient duration so that if there is any noise associated with the impulse, it will ignore that noise. The output pulse is transmitted through another one-shot multivibrator 258 which produces an output of predetermined short duration on the order of 50 microseconds. This pulse is then coupled into the clock-up terminal of the first of two cascaded counters 260 and 262.

As brought out hereinabove, pulses derived from light bursts at the projector are also coupled to the control unit 11. These pulses are received at jack 266 and coupled through comparators 268 and 270.

Essentially, the light bursts going to the sensor are compared and a square wave is produced that has a frequency three times that of the frame rate of projector 19. At eighteen frames per second, for example, this is 54 Hz. This signal is then shaped by one-shot multivibrator 272 which achieves a fast rise-fall edge. This signal is then coupled to a divide-by-three circuit 274 which is composed of two master slave JK flip-flops. The output signal is then coupled into another one-shot multivibrator 276 which further shapes the signal into a pulse similar in duration to the timing pulse coming from the recorder (which is fed into the clock-up terminal of the counter 260) with the output from one-shot multivibrator 276 being coupled to the clock-down terminal of counter 260.

Counters 260 and 262 are cascaded so that the total count on the clock is from 0 to 256 in a binary code. The control voltage is the most significant of the clock output and is coupled through an inverter 280 and a low pass filter and DC amplifier circuit 282 whose time constant is 45 milliseconds. The filter tends to take the square wave and smooth it out approximately direct current, so that when the motor of the tape recorder is being driven with this voltage, there will be a minimum of flutter. The DC amplifier provides a high and low level for the speed control of the tape recorder. This DC control voltage is coupled through a transmission cable to jack 284 of the recorder and thus is connected with the base of driving transistor 216. As mentioned previously, driving transistor 216 is an emitter follower transistor, and the voltage at its base appears at its emitter, and thus across the transistor to the motor of the recorder.

The projector pulse signal is additionally sampled after the first one-shot multivibrator 272 and the output used to drive an RS flip-flop 288 (made up a pair of NOR gates). At flip-flop 288, the Q output is normally low. The Q output of flip-flop 288 is connected with the base of transistor 290 the collector of which is connected to jack 284.

The first pulse from the projector sets the RS flip-flop 288 so that the Q output is high and turns on transistor 290. This allows current to flow from the base of driving transistor 218 in the recorder, thus saturating transistor 281, and placing +6 volt at the collector of transmitter 216. This enables transistor 216 to drive motor 220 of the recorder. In this manner, an automatic start of the recorder has been achieved by the first pulse from the first frame of the film.

At the same time, the $\overline{Q}$ output from RS flip-flop 288 fires a one-shot multivibrator 292, and a narrow pulse is produced and coupled to the load input of both counters 260 and 262. This resets the counters to a predetermined binary number.

The R input of RS flip-flop 288 is coupled from comparator 294 which senses the tape pulse quiescent level. When the recorder is turned off or the recorder is in the rewind mode, the quiecent level drops to zero, resetting the RS flip-flop.

The clock memory (formed by counters 260 and 262) makes possible synchronous of the film and recording tape, and also joins the scenes together. In making synchronous starts, the projector is running as the tape recorder is starting up. Therefore, the clock will be counting down from the pulses from the projector, just as the tape starts up. The tape recorder speed will be at a maximum as the tape pulses count up on the counter until they offset the number of pulses that the counter has counted down from the projector. At this point, synchronization of the film and the tape has been reached.

In joining the scenes together, there is a lapse of time on the tape recorder between the last pulse of the preceeding scene and the first pulse of the next scene. There is no lapse of time, however, on the film from one scene to another. This throws the film and tape out of synchronization. However, the clock begins counting down from the incoming pulses from the projector during the tape pulse time lapse. During this time, the tape speed will be at a maximum. Upon again receiving pulses from the tape when the next scene begins, the clock begins counting these tape pulses (during which time the recorder speed is still at a maximum) until it offsets the clock count from the projector. At this point, synchronization of the film and tape has been again established.

To insure that the first burst of light that strikes the sensor corresponds to the first frame of the film 296 that has been shot, an opaque length 297 of film is preferably inserted into the film immediately in front of the first frame the recorder speed is still at a maximum) until it offsets the clock count from the projector. At this point, synchronization of the film and tape has been again established.

Figure 6:
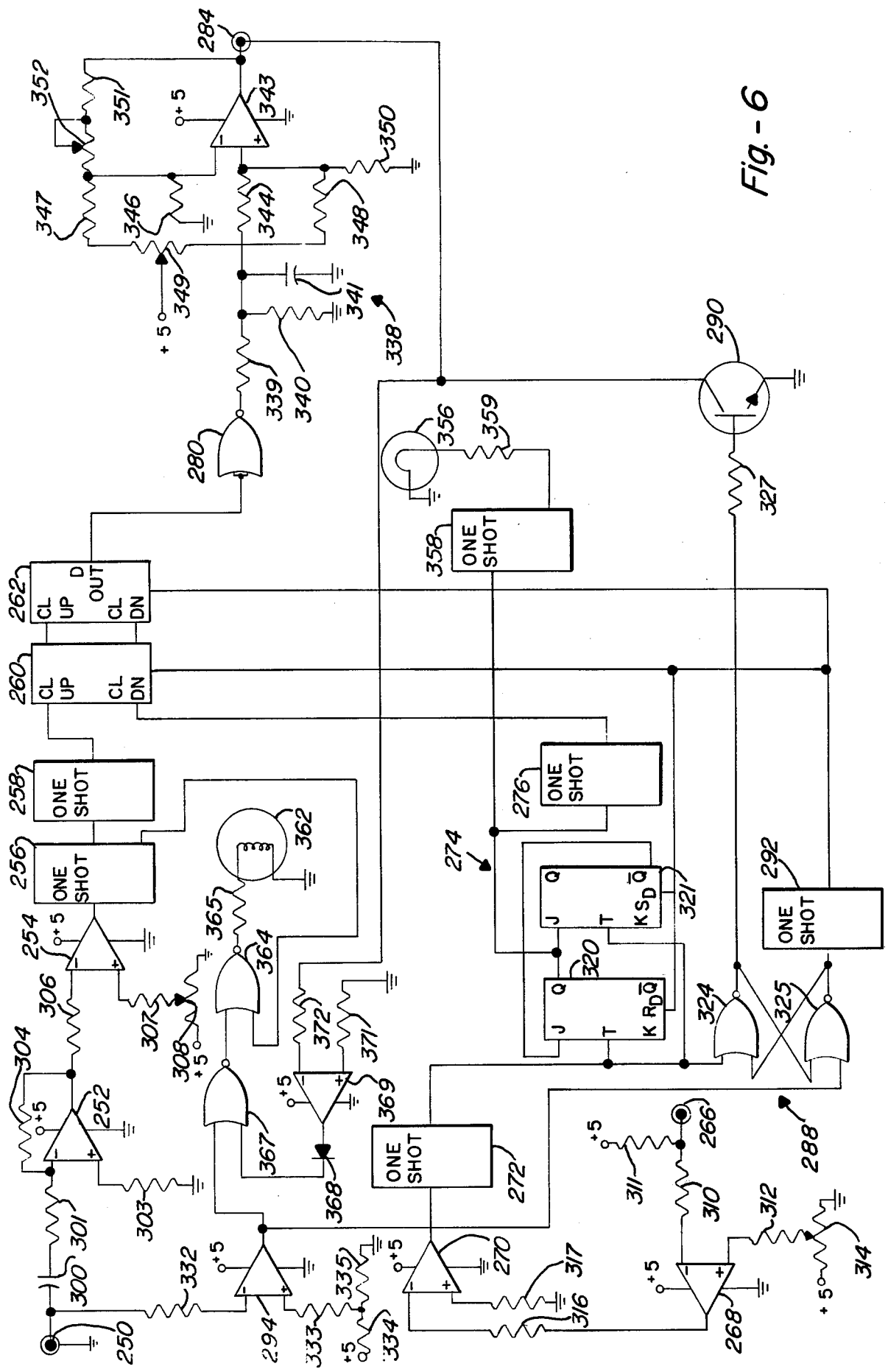
FIG. 6 is a combined schematic and block diagram of the control unit as shown in FIG. 5.

To insure that the first burst of light that strikes the sensor corresponds to the first frame of the film 296 that has been shot, an opaque length 297 of film is preferably inserted into the film immediately in front of the first frame as set forth in block form in FIG. 5. As shown in FIG. 6, the timing signal from the tape recorder is coupled into the control unit at jack 250 and is coupled through capacitor 300 and resistor 301 to the − input of 26 db gain amplifier 252. The + input of amplifier 252 is connected with ground through resistor 303, while the output and − input are connected through resistor 304.

The output from amplifier 252 is coupled through resistor 306 to the − input of comparator 254, the + output of which is connected through resistor 307 to the center tap of potentiometer 308, which potentiometer is connected between the +5 volt power source and ground. The output from comparator 254 is coupled through conventional one-shot multivibrators 256 and 258 to counter 260 as described hereinabove.

The signal from projector 19 coupled to the control unit at jack 266 is coupled through resistor 310 to the − input of the comparator. In addition, the junction of jack 266 and resistor 310 has a resistor 311 connected with the +5 volt power supply, and the + input of comparator 268 is connected through resistor 312 with the center tap of potentiometer 314, which potentiometer is connected between the +5 volt power source and ground.

The output from comparator 268 is coupled through resistor 316 to the − input of comparator 270. The + input of comparator 270 is connected with ground through resistor 317, and the output from comparator 270 is coupled to conventional one-shot multibibrator 272.

The output from one-shot multivibrator 272 is coupled to the T inputs of JK flip-flops 320 and 321 which are connected to operate as a divide-by-three circuit 274. As shown, the Q output of flip-flop 320 is connected to conventional one-shot multivibrator 276 the output of which is coupled to counter 260.

As also shown in FIG. 6, the output one-shot multivibrator 272 is also coupled to one input of NOR gate 324 which gate along with NOR gate 325 comprises RS flip-flop 288.

The output from NOR gate 324 (i.e., the output from flip-flop 288) is coupled through resistor 327 to transistor 290 (the collector of which transistor is connected to jack 284).

As also shown in FIG. 6, and as brought out hereinabove, the output from NOR gate 325 (i.e., the $\overline{Q}$ output from flip-flop 288) is coupled to one-shot multivibrator 292 for resetting counters 260 and 262.

To reset flip-flop 288, the signal at jack 250 is coupled through resistor 332 to the negative input of comparator 294. The positive input of comparator 294 is connected through resistor 333 to the junction of resistors 334 and 335 which are connected in series between the +5 volt power supply and ground. The output from comparator 294 is coupled to NOR gate 325 (i.e., to the R input of flip-flop 288).

The output from counter 262 is coupled through inverter 280 to low pass filter 338 which includes resistors 339 and 340 and capacitor 341. The output from the filter is then coupled to the + input of DC amplifier 343 (a 26 db gain amplifier) through resistor 344. As shown in FIG. 6, the − input of amplifier 343 is connected with ground through resistor 346, while the − and + inputs are connected through series connected resistors 347 and 348 and potentiometer 349 with the positive input also being connected with ground through resistor 350. In addition, the output and − input of amplifier 343 are connected through resistor 351 and potentiometer 352. As id described hereinabove, the output of amplifier 343 is connected to jack 284.

The playback system also includes two monitoring circuits with check lights to indicate that appropriate signals are present from both projector and recorder sources and that the system is assembled properly and in the proper mode.

In order to confirm that the light sensor 244 is properly attached to lens barrel 245 of projector 19 by metal clip 245, so that the light sensor 244 is actually properly picking up the bursts of light from the running projector 19, a check light 356 (connected with flip-flop 320 through one-shot multivibrator 358 and resistor 359) is included in circuit and will flicker on and off when sensing is being accomplished.

An additional check light 362 may also be included in the playback controller and will test, or monitor, a number of functions, including determining that the record signal plug is in place, determining that the motor control plug is in place, that a proper sync start has been achieved, that the recorder's play button was depressed at the start of a film, and that signal pulses are being received from the tape recorder during showing.

An indicator, or light, 362 is connected to the output of NOR gate 364 through resistor 365, while NOR gate 364 receives inputs from the output of NOR gate 367 and from the YES output of one-shot multivibrator 256. The inputs to NOR gate 367 are connected with the output from comparator 294 and through diode 368 to amplifier 369. The input of transistor 369 is connected through resistor 371 with ground, and the − input is connected through resistor 372 with the collector of transistor 290.

A typical movie viewing sequence utilizing lights 356 and 362 would include turning on controller by switch 363 at the front panel of the controller unit 20, placing the light sensor on the project lens barrel, and turning on the projector. If indicator 356 is operating properly, the projector is turned off and the tape recorder is depressed and a check made to be sure that indicator 362 will flicker until the end of the film.

Also incorporated into the playback controller 20 is a means of governing the speed of an induction motor, which is common to many projectors, using a full wave triac phase control. A problem can occur when the speed of the induction motor is reduced to a point where the induction motor will work at a lower speed but there is not sufficient starting torque in the motor to achieve a rapid start-up of the motor, and thus achieve a synchronous start of sound and film.

Figure 7:
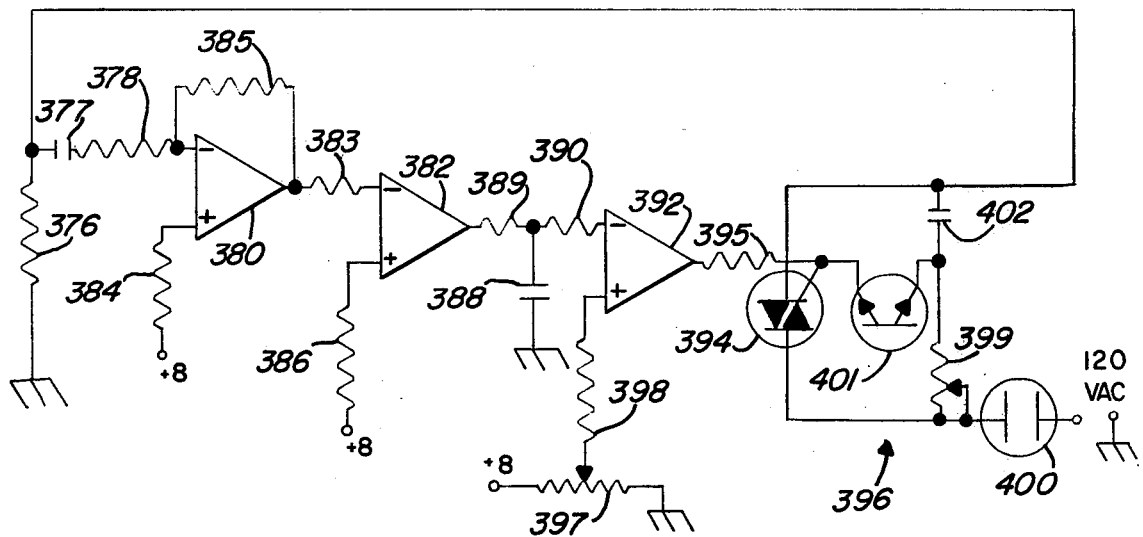
FIG. 7 is a schematic design of start-up control circuitry for a movie projector as used in the playback mode.

In order to overcome this difficulty, a motor torque control circuit may be incorporated into the full wave triac phase control as shown by FIG. 7. The associated circuitry shown functions such that full power is applied to the motor when the motor's load is applied to the circuit and persists for a short time in order that the motor will have a consistently high starting torque. The high torque capability is realized through the use of a current sensing circuit. When the motor's load is applied, a voltage is developed across resistor 376 (a very small resistor). The signal is capacitively coupled through capacitor 377 and through resistor 378 to an amplifier 380 with gain 100, the output of which is coupled to the − input of comparator 382 through resistor 383. The + input of amplifier 380 is connected with a +8 volt from supply through resistor 384, while the output and − input of amplifier 380 are connected through resistor 385. In like manner, the + input of amplifier 382 is connected with the +8 volt power supply through resistor 386.

The output from amplifier 382 is a square wave output that is utilized to charge capacitor 388 through resistor 389 according to that time constant. The output is then coupled through resistor 390 to the − input of comparator 392 that functions to hold the triac 394 (connected to the output of comparator 392 through resistor 395) on for a short time until capacitor 388 is sufficiently charged to allow a high torque start. At this time, the output of comparator 392 goes low, and triac control is transferred to the half wave phase control circuit 396. Potentiometer 397 connected to the + input of comparator 392 through resistor 398 serves to determine the time interval for which the triac is turned full on. Potentiometer 399 connected at one side to power socket 400 and at the other side to diac 401 and capacitor 402 adjusts the angle of conduction of the full wave control for when the motor torque control drops out and is controlled by knob 404 on the front panel of the control unit 20.

In operation, the movie camera is connected to the control circuitry (which is built into the tape recorder) for filming. This automatically controls the tape recorder to operate whenever the camera operates and, in addition, records a timing signal on the tape during the filming. For playback, a movie projector is connected with the external control unit (which is connected with the tape recorder) and operation of both the timing signal from the tape recorder and pulse indicative of operation of the projector itself are sensed. The sound, of course, has been placed on the tape and the control unit automatically causes the tape recorder to be operated at a speed to bring the film and sound into synchronization and then maintain the synchronization throughout playback.

As can be seen from the foregoing, this invention provides an improved synchronizing system that is particularly useful for synchronizing motion picture and sound recordings.

What is claimed is:

1. A system for synchronizing motion picture and sound recordings, said system comprising:
   sensor means for sensing film movement in a movie camera during filming of a motion picture and in a movie projector during playback of said filmed motion picture, said sensor means producing electrical output signals indicative of sensed film movement; and
   control means for receiving said electrical output signals from said sensor means and providing, when in a filming mode, output signals for controlling operation of a recorder when connected with said control means and for causing recording of a timing signal on said recorder, said control means also providing, when in a playback mode and receiving said timing signals from said recorder when connected with said control means, output signals for controlling operation of said recorder to achieve synchronization of sound recorded on said recorder with the motion picture produced by said projector during playback.

2. The system of claim 1 wherein said control means includes means for causing substantially immediate operation of the recorder connected with said control means when film movement is sensed by said sensor means.

3. A system for enabling synchronization of motion picture and sound recordings, said system comprising:
   sensor means for sensing film movement in a movie camera during filming of a motion picture, said sensor means producing electrical output signals indicative of sensed film movement;
   timing signal generating means connected with said sensor means, said timing signal generating means including detecting means for detecting the envelope of said electrical output signals received from said sensor means and processing means connected with said detecting means for receiving said detected envelope and responsive thereto providing a timing signal for recording on recorder connected with said timing signal generating means; and
   control signal generating means connected with said sensor means, said control signal generating means responsive to an output signal received from said sensor means providing a control signal for controlling operation of said recorder when connected with said control signal generating means.

4. The system of claim 3 wherein said system includes a sensor assembly having said sensor means therein, a portion of said sensor assembly being adapted to be received in a socket in a movie camera for sensing film movement therein.

5. The system of claim 3 wherein said timing signal generating means includes an automatic gain control circuit connected to receive said electrical output signal from said sensor means to provide a constant level output signal regardless of the source of said electrical output signals.

6. The system of claim 5 wherein said automatic gain control circuit includes a field effect transistor the output from which is coupled to an operational amplifier with the output from said operational amplifier being coupled to a summing amplifier to produce a signal for controlling the impedance of said field effect transistor.

7. The system of claim 3 wherein said processing means of said timing signal generating means includes band pass filter means for receiving the output from said envelope detecting means and a frequency dividing circuit connected to receive the output signal from said band pass filter means.

8. The system of claim 7 wherein said band pass filter means includes three active cascaded band pass filters for producing an output signal at substantially twice the frequency of said timing signal, and wherein said frequency dividing circuit is a divide-by-two circuit.

9. The system of claim 7 wherein said processing means of said timing signal generating means including switching means comprising a pair of complementary transistors connected in said circuit.

10. The system of claim 9 wherein said recorder is a tape recorder and wherein said system includes a capacitor connected across one of said transistors to produce a positive and then negative impulse to charge and discharge the tape head of said tape recorder and thus maintain said tape head demagnetized while recording said impulses.

11. The system of claim 3 wherein said control signal generating means includes means connected with said timing signal generating means to preclude generating of a timing signal unless presence of an output signal from said sensor means is received from said control signal generating means.

12. The system of claim 3 wherein said control signal generating means includes means for causing upon receipt of an output signal from said sensor means, substantially immediate operation of said recorder when connected with said control signal generating means.

13. The system of claim 3 wherein said control signal generating means includes tape advance means to cause the tape of a tape recorder when connected to said system to be advanced a predetermined distance upon initial actuation at the start of filming to provide a tape leader for later playback utilizing said tape.

14. The system of claim 3 wherein said system includes bypass means for enabling normal operation of said recorder connected to said system.

15. A system for enabling synchronization of motion picture and sound recordings, said system comprising:
sensor means for sensing film movement in a movie camera during filming of a motion picture, said sensor means producing electrical output signals indicative of sensed film movement;
timing signal generating means connected with said sensor means, said timing signal generating means, responsive to receipt of an electrical output signal from said sensor means, producing a timing signal for recording on a recorder connected with said timing signal generating means;
control signal generating means connected with said sensor means, said control signal generating means, responsive to an electrical output signal received from said sensor means, producing a control signal for controlling operation of said recorder when connected with said signal generating means; and
inhibit means connected with said timing signal generating means and receiving an output from said control signal generating means to preclude generation of said timing signal unless an output is produced by said control signal generating means indicative of an electrical output signal received from said sensor means.

16. The system of claim 15 wherein said control signal generating means includes a silicon controlled rectifier connected to receive said output signals from said sensor means for producing an output signal when an output signal is received from said sensor means that is above a predetermined threshold value.

17. The system of claim 16 wherein said silicon controlled rectifier is a low noise non-latching switch.

18. A system for enabling synchronization of motion picture and sound recordings, said system comprising:
sensor means contiguous to a movie camera to sense film movement in said movie camera during filming and producing electrical output signals indicative of said sensed film movement;
a silicon controlled rectifier connected to receive said electrical output signals from said sensor means;
motor control means connected with said silicon controlled rectifier and producing an output to control operation of a tape recorder connected with said motor control means upon receipt of an output from said silicon controlled rectifier, said motor control means including means to cause substantially immediate operation of said tape recorder upon receipt of an output signal from said sensor means;
envelope detection means connected to receive said output signal from said sensor means;
band pass filter means connected with said envelope detection means to receive the detected envelope therefrom and producing an output signal at a predetermined frequency;
a frequency divider for receiving said output from said band pass filter means and providing a timing signal at a predetermined lower frequency;
an inhibit gate receiving said timing signal from said frequency divider;
signal presence monitoring means connected with said silicon controlled rectifier to receive the output therefrom and providing a second input to said inhibit gate so that said inhibit gate produces an output only when an output signal is received from said silicon controlled rectifier; and means for receiving said timing signal from said inhibit gate and causing the same to be recorded on said tape recorder.

19. A system for achieving and maintaining synchronization of picture and sound recordings, said system comprising:
sensor means for sensing film movement in a projector during playback of a picture, said sensor means producing electrical output signal indicative of sensed film movement;
first circuit means for receiving said output signals from said sensor means and providing a first pulse output signal;
second circuit means for receiving a timing signal from a recorder when connected with said system, said second circuit means producing a second pulse output signal;
counter means including a pair of counters one of which is connected with said first and second circuit means to count up when pulses are received from one of said circuit means and to count down when pulses are received from the other of said circuit means; and
speed control means connected with said counter means to receive the output therefrom and responsive thereto controlling operation of a said connected recorder whereby sound from said recorder is automatically synchronized with a picture projected by said projector.

20. The system of claim 19 wherein said first circuit means includes a pair of comparators one of which is connected to receive said output signals from said sensor means and the other of which produces a square wave output, said first circuit means also including pulse generating means connected with said other comparator and producing said first output signal.

21. The system of claim 19 wherein said sensor means provides an output having a frequency substantially n times that of said timing signal; and wherein said pulse generating means includes a frequency dividing circuit to divide the frequency of said square wave output from said comparators by n.

22. The system of claim 19 wherein said speed control means includes a low pass filter means and DC amplifier means.

23. The system of claim 19 wherein said first circuit means includes means for causing substantially immediate operation of said recorder upon receipt of an output signal from said signal means.

24. The system of claim 23 wherein said means for causing operation of said recorder includes a flip-flop connected to assume a predetermined state upon receipt of an output signal from said sensor means, said flip-flop being connected with said second circuit means and said counter means for reset purposes.

25. The system of claim 19 wherein said counter means is responsive to the pulse output signals, from said first and second circuit means to achieve and maintain synchronization between picture and sound between scenes of a picture by controlling operation of said recorder in response thereto.

26. The system of claim 19 wherein said sensor means senses film movement in a movie projector by sensing light bursts, and wherein the film utilized with said movie projector has a length of opaque leader thereon to ensure that the first burst of light sensed by said sensor means corresponds to the first frame of film.

27. The system of claim 19 wherein said system includes indicator means connected with said circuit means for indicating proper assembly and operation of said system.

28. The system of claim 27 wherein said indicator means includes a first light connected with said first circuit means for indicating that said sensor means is sensing film movement as intended, and a second light connected with said second circuit means for indicating proper operation of said system as well as receipt of said timing signal.

29. The system of claim 19 wherein said system includes projector start-up means for causing substantially immediate operation of said projector.

30. The system of claim 29 wherein said projector start-up means includes a motor torque control circuit for assuring initial application of full power to a projector motor for a predetermined period of time to provide a consistently high starting torque for the motor.

31. The system of claim 30 wherein said motor torque control circuit includes a sound pitch control to permit manual control to said projector, said manual control also controlling the speed of said recorder through said projector, said sound pitch control thus permitting manual control of the pitch of recorded sound reproduced by said recorder.

32. A system for achieving and maintaining synchronization of motion picture and sound recordings, said system comprising:
sensor means for sensing film movement in a movie projector during playback of a motion picture, said sensor means producing output signals at a predetermined frequency;
a pair of comparators connected to receive said output from said sensor means and producing a square wave output at substantially the frequency of said output signals from said sensor means;
a frequency divider circuit connected with said comparators to divide the frequency of said square wave signal by a predetermined number;
a flip-flop connected with said comparators to cause substantially immediate operation of said tape recorder when an output is received from said comparators from said sensor means;
coupling means connected with a tape recorder for receiving a timing signal therefrom, said timing signal having substantially the same frequency as the output signal from said frequency divider circuit;
a pair of counters connected with said coupling means and said frequency divider circuit, said counters counting up when receiving an output signal from said frequency divider circuit and counting down when receiving an output signal from said coupling means, said counters producing an output signal indicative of the count on said counters; and
a low pass filter and DC amplifier circuit connected to said counters to receive the output therefrom and provide a tape recorder drive output signal for automatically achieving and maintaining synchronization of sound recorded on said tape recorder with a motion picture produced by operation of said movie projector.

33. A sensing device for sensing film movement in a movie camera, said sensing device comprising:
a sensor for sensing film movement in a movie camera when said sensor is contiguous to said movie camera, said sensor producing an electrical output signal indicative of sensed film movement;
a positioning assembly having said sensor received therein, said positioning assembly having one portion insertable into a socket of a movie camera so that when so positioned said sensor is contiguous to said movie camera; and
signal coupling means connected with said sensor to enable coupling said electrical output signal from said sensing device.

34. The sensing device of claim 33 wherein said positioning assembly is a cylinder having said one portion with threads thereon whereby said cylinder may be screwed into a tripod socket of a camera.

35. The sensing device of claim 34 wherein said cylinder has a second portion providing a tripod socket assembly.

* * * * *

UNITED STATES PATENT AND TRADEMARK OFFICE
CERTIFICATE OF CORRECTION

PATENT NO. : 4,183,632
DATED : Jan. 15, 1980
INVENTOR(S) : Nutting et al.

It is certified that error appears in the above-identified patent and that said Letters Patent are hereby corrected as shown below:

Column 3, line 31, insert a period at the end of the line.

Column 4, lines 12 and 63, "14" should not be dark.

Column 6, line 46, "-" should be -- + --.

Column 7, line 21, "+" should be -- - --.

Column 10, line 1, "281" should be --218--.

Column 10, delete lines 43 through 50.

Figure 8:
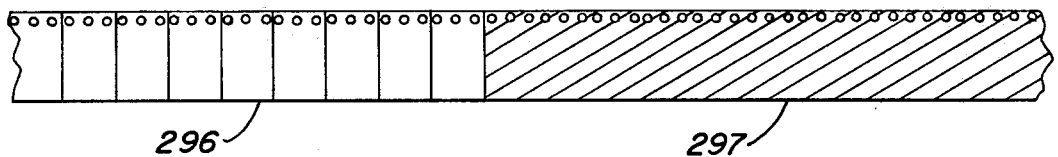
FIG. 8 is a partial view of a section of film showing the use of an opaque leader thereon.

Column 10, line 55, after "frame" add -- of the film (as shown in FIG. 8), or an opaque length of tape can be adhered to the frames of film preceeding the first frame of film. Either will prevent both a premature start-up of the projector or an incorrect sync start after the film has been threaded into the projector upon starting of the projector for viewing.
FIG. 6 shows in greater detail the control circuit --

Signed and Sealed this

First Day of September 1981

[SEAL]

Attest:

Attesting Officer

GERALD J. MOSSINGHOFF
Commissioner of Patents and Trademarks